(12) United States Patent
Henssler et al.

(10) Patent No.: US 9,803,535 B2
(45) Date of Patent: Oct. 31, 2017

(54) COOLING SYSTEM OF AN INTERNAL COMBUSTION ENGINE

(75) Inventors: Felix Henssler, Konstanz (DE); Jörg Andre Reitz, Salem (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 801 days.

(21) Appl. No.: 13/508,532

(22) PCT Filed: Nov. 4, 2010

(86) PCT No.: PCT/EP2010/006723
§ 371 (c)(1),
(2), (4) Date: Jun. 26, 2012

(87) PCT Pub. No.: WO2011/054517
PCT Pub. Date: May 12, 2011

(65) Prior Publication Data
US 2012/0266587 A1 Oct. 25, 2012

(30) Foreign Application Priority Data
Nov. 6, 2009 (DE) .................... 10 2009 052 151

(51) Int. Cl.
*F01N 3/02* (2006.01)
*F01P 3/12* (2006.01)
*B60T 5/00* (2006.01)
*B60T 10/02* (2006.01)
(Continued)

(52) U.S. Cl.
CPC ............... *F01P 3/12* (2013.01); *B60T 5/00* (2013.01); *B60T 10/02* (2013.01); *F01N 3/043* (2013.01);
(Continued)

(58) Field of Classification Search
CPC ........ F01N 3/043; F01N 3/046; F01N 33/107; F01P 3/12; B60T 5/00; B60T 10/02;
(Continued)

(56) References Cited

U.S. PATENT DOCUMENTS 2,713,332 A 7/1955 Beardsley
3,856,485 A * 12/1974 Mansell ........................ 95/92
(Continued)

FOREIGN PATENT DOCUMENTS

DE 19849945 A1 5/2000
DE 10351845 A1 6/2005
(Continued)

OTHER PUBLICATIONS

Machine English translation of JP2010-229878A.*

*Primary Examiner* — Patrick Maines
*Assistant Examiner* — Jason Sheppard
(74) *Attorney, Agent, or Firm* — Reising Ethington P.C.

(57) ABSTRACT

The invention relates to the cooling system of an internal combustion engine (10) which comprises a combustion engine (12) having at least two cylinder banks (14, 16) and a number of exhaust gas exchangers (18, 20) identical to the number of cylinder banks, as well as a retarder connection, wherein the cooling system can be flown through by a fluid serving as coolant in a preferred flow direction and comprises a cooling system trunk section (30) and a number of cooling system branch sections identical to the number of the cylinder banks (14, 16) of the combustion engine (12), said cooling system branch sections comprising each a cylinder bank branch section (22, 24), an exhaust gas exchanger branch section (36, 38) and a combining branch section (44, 46). The invention further relates to an internal combustion engine (10) corresponding thereto.

17 Claims, 1 Drawing Sheet

(51) Int. Cl.
*F01N 3/04* (2006.01)
*F01N 13/10* (2010.01)
*F02B 75/22* (2006.01)
*F02M 26/28* (2016.01)
*F02M 26/24* (2016.01)

(52) U.S. Cl.
CPC ............ *F01N 13/107* (2013.01); *F02B 75/22* (2013.01); *F01P 2060/06* (2013.01); *F01P 2060/08* (2013.01); *F01P 2060/16* (2013.01); *F02M 26/24* (2016.02); *F02M 26/28* (2016.02); *Y02T 10/20* (2013.01)

(58) Field of Classification Search
CPC ........ F02M 26/22; F02M 26/24; F02M 26/30; F02M 26/33
USPC .................................................. 60/320, 321
See application file for complete search history.

(56) References Cited

U.S. PATENT DOCUMENTS

| | | | |
|---|---|---|---|
| 6,363,717 B1* | 4/2002 | Kschischo | F01N 3/046 60/320 |
| 6,644,024 B1* | 11/2003 | Powers et al. | 60/320 |
| 7,370,611 B1* | 5/2008 | White et al. | 123/41.01 |
| 2008/0060624 A1 | 3/2008 | Grandas | |

FOREIGN PATENT DOCUMENTS

| | | |
|---|---|---|
| DE | 102006012847 A1 | 9/2007 |
| DE | 102007033679 A1 | 1/2009 |
| DE | 102007033679 B4 | 7/2009 |
| DE | 102008013675 A1 | 9/2009 |
| EP | 0219351 A2 | 4/1987 |
| EP | 0219351 B1 | 12/1990 |
| EP | 1106802 A1 | 6/2001 |
| EP | 1719886 A1 | 11/2006 |
| EP | 1830046 A2 | 9/2007 |
| EP | 1947306 A1 | 7/2008 |
| EP | 1106802 B1 | 9/2009 |
| JP | 63138114 A | 6/1988 |
| JP | 2010229878 A | 10/2010 |
| WO | WO-9501500 A1 | 1/1995 |
| WO | WO-2004085807 A1 | 10/2004 |
| WO | WO-2008015791 A1 | 2/2008 |
| WO | WO-2010119545 A1 | 10/2010 |

* cited by examiner

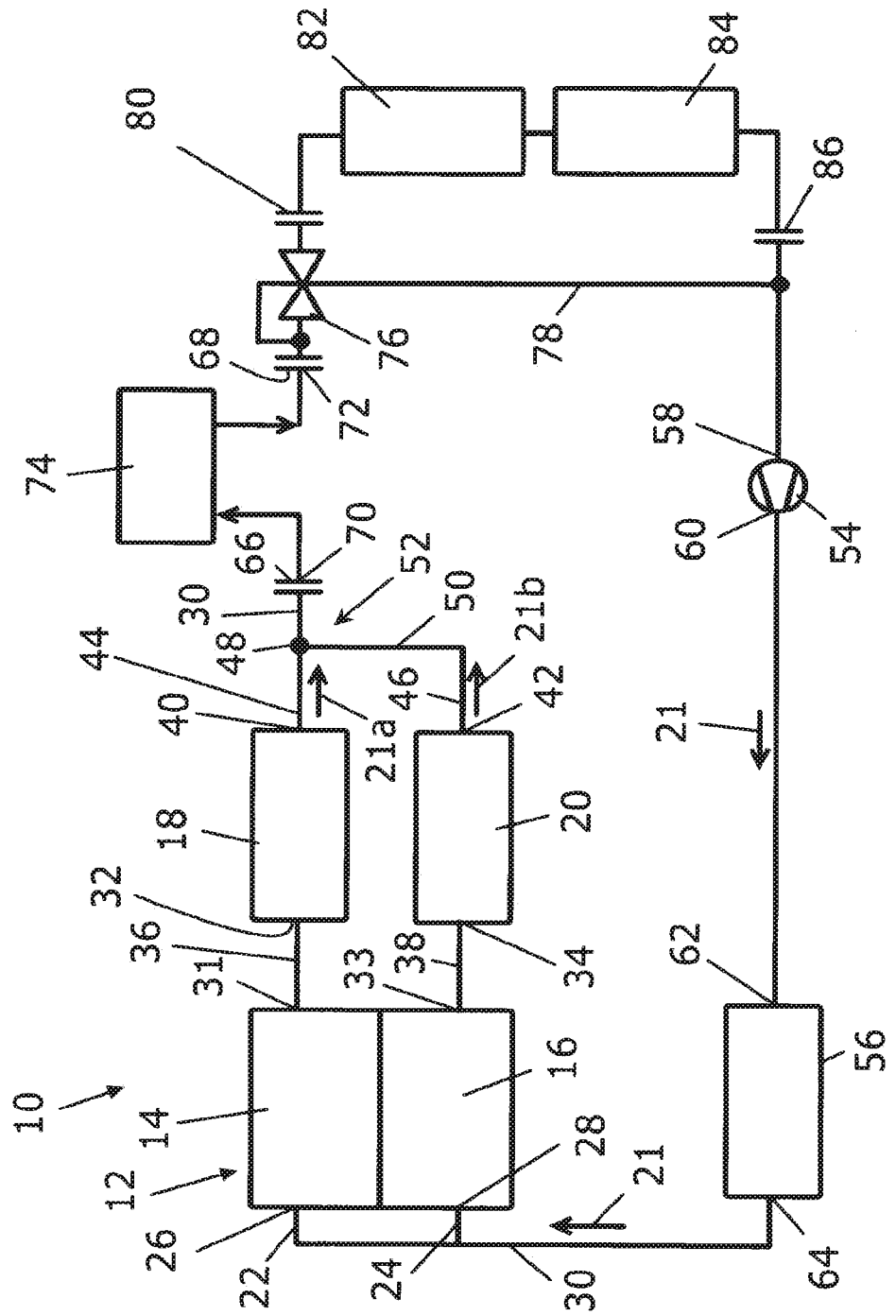

COOLING SYSTEM OF AN INTERNAL COMBUSTION ENGINE

CROSS-REFERENCE TO RELATED APPLICATIONS

This application claims priority to German Patent Application 10 2009 052 151.8 filed on Nov. 6, 2009 and PCT/EP2010/006723 filed on Nov. 4, 2010, which are hereby incorporated by reference in their entireties.

TECHNICAL FIELD

The present disclosure concerns a cooling system for an internal combustion engine. Furthermore, the disclosure concerns a combustion engine according to claim 9.

BACKGROUND

Combustion engines are used in many fields, among them, for example the field of vehicle technology. Besides combustion engines that have a cylinder bank, combustion engines are also known wherein two cylinder banks are arranged in a V-shape pattern to each other (so-called V-motors). In order to be able to avoid damage to the combustion engine of a vehicle by overheating, these generally have a cooling system through which coolant flows and which provides temperature control for the combustion engine, and if applicable, also for additional vehicle components, such as a passenger compartment. For cylinder banks arranged in V-shape pattern, a coolant flows through the cylinder banks, each in parallel, and they are thereby cooled.

A significant issue in the field of vehicle manufacturing is presented in a vehicle's emission values. An important role for good emission values, besides an air-fuel ratio that is adjusted correctly and optimally for each operating situation, is also attributed to the fact that the combustion process should be as steady as possible in the same marginal conditions. One of the marginal conditions that play a role in the exhaust gas quality is an even and possibly steady temperature control or cooling of the motor or the individual cylinder banks of a combustion engine.

Another improvement of the emission values can be achieved by so-called exhaust gas heat exchangers, wherein a part of the exhaust gas from combustion engines is cooled before it is mixed into the air that is aspired by the combustion engine and led into the combustion process once again. A heat exchanger as well requires possibly steady marginal conditions, especially steady marginal conditions regarding the cooling of the exhaust gas, in order to be able to influence the emission values to the desired extent.

Besides the aforestated components, the combustion engines in the state of the art, however also have additional equipment, which requires at least a temporary cooling. As an example for such, the document DE 10 2006 012 847 A1 should be mentioned, disclosing a device for heating a cooling circuit of a combustion engine, wherein a retarder is connected to the drive of the combustion engine and wherein exhaust heat of the retarder is at least temporarily fed into a cooling circuit. The retarder comprises a fixed stator and a rotor that is movable relative to the stator, while the rotor is connected with the drive of the combustion. Both the stator as well as the rotor has paddle wheels. When the vehicle's combustion engine is in motion, so will be the rotor of the retarder. As soon as a fluid is led into the retarder housing, the rotor will set the fluid in rotation and press it against the paddle wheels of the stator, whereby kinetic energy is converted to heat and the vehicle brakes. Oils, but also water or the coolant flowing through the cooling system of the combustion engine come into consideration as fluids that can be led into the retarder housing.

A purpose of present disclosure is to provide a cooling system for a combustion engine with at least two cylinder banks, which ensures a possibly even temperature control or cooling of the individual cylinder banks and an identical number of exhaust gas heat exchanger as the number of cylinder banks, whose temperature also has to be controlled, while at the same time also other coolant consumers can be supplied reliably. It is furthermore a purpose of present disclosure to provide an appropriate combustion engine.

This purpose is fulfilled by the cooling system with the characteristics of Claim 1. Regarding the combustion engine, the purpose is fulfilled by a combustion engine with the characteristics of Patent Claim 9.

SUMMARY

A cooling system, through which fluid serving as coolant flows in a preferred flow direction (flow direction during operation of the combustion engine), comprises a cooling system's primary section and an identical number of cooling system secondary sections as the number of cylinder banks and the exhaust air heat exchangers of the combustion engine's CI motor. The cooling system's branch sections each have one cylinder branch section, one branch section for the exhaust gas heat exchanger, and a merging branch section. The cooling system's primary section ends in the cylinder bank branch sections, which each have one outlet for the cylinder bank's branch section, which can be provided for possible contact with fluid by a cylinder bank inlet. The exhaust air exchanger's branch sections each have a branch section inlet for the exhaust gas heat exchanger and a branch section outlet for the exhaust heat exchanger, each of which can be provided with a designated cylinder bank outlet and a designated inlet of the exhaust air heat exchanger for possible contact with fluid. The merging branch sections each have one merging branch section inlet, which can be respectively provided with a designated outlet for the exhaust gas heat exchanger for possible contact with fluid. The merging branch sections are furthermore in contact with the fluid in the preferred flow direction in downstream of the merger inlets for the merging branch sections with the cooling system's primary section, or they end in it, meanwhile a connection device is provided for a retarder in the cooling system's primary section (a retarder flow-line connection and a retarder feedback connection.)

Thereby that the connection device for the retarder is intended in the cooling system's primary section, the retarder can be supplied with the total coolant flow, while the components that are responsible for the emission values and which are to be cooled can be supplied with partial coolant flows that are as steady as possible. A hook-up of a connected retarder additionally also only minimally affects the coolant's even distribution in the cooling system's branch sections, since the flows occur in the cooling system's primary section and the flow conditions in the coolant's branch sections are thus not affected differently. By this method an even cooling of the components that are relevant for exhaust gas is ensured.

Additional characteristics and advantages of the disclosure are shown in the following description of possible embodiments of the disclosure, by means of the enclosed drawing showing the details that are relevant for the disclosure and in the claims. The individual characteristics can each be embodied by themselves or in several optional combinations in a variant of the disclosure.

A possible embodiment of the disclosure is explained in more detail in the following by means of the enclosed drawing.

BRIEF DESCRIPTION OF THE DRAWINGS

FIG. 1 as an example for a possible embodiment of the disclosure's cooling system, implemented in an exemplified embodiment of a combustion engine.

DETAILED DESCRIPTION

The schematic design of a possible embodiment of the disclosure's cooling system is shown as example in FIG. 1 and is presented schematically in interaction with a combustion engine 10.

The combustion engine 10 has a compression ignition (CI) motor 12 (hereinafter also referred to as motor 12) with a first and second cylinder bank 14, 16, whereas alternatively also motors with more than two cylinder banks could be feasible. The motor 10 described as an example is a motor wherein the two cylinder banks 14, 16 are arranged in a V-shape pattern to each other (V-motor) while also motors with other cylinder bank design could be feasible (e.g. in-line motors sectioned in several in-line cylinder banks etc.) Besides motor 12, the combustion engine 10 furthermore has a first and a second exhaust air heat exchanger 18, 20, which are both components of an exhaust air cooler (not shown.)

The first exhaust air exchanger 18 is attributed to the first cylinder bank 14 and serves for the cooling of a part (preferably 30% to 40%) of the exhaust gas created in the first cylinder bank 14, while the second exhaust gas heat exchanger 20 is attributed to the second cylinder bank 16 and cools part of the exhaust gas (preferably 30% to 40%) that is created there. The cooled parts of the exhaust gas are subsequently led into an additional combustion process through an air inlet of motor 12, whereby the emission values of motor 12 or combustion engine 10 are affected positively.

For cooling of the two cylinder banks 14, 16, channels or material recesses are provided on the cylinder banks 14, 16 through which a coolant flows during the operation of combustion engine 10. In the described embodiment, the channels or material recesses, which function as motor heat exchangers, are integral components of the motor 12. In alternative to these, however, also motor heat exchangers are feasible, which comprise an independent device and might possibly not be attributed to the motor 12, but instead to the cooling system of the combustion engine 10.

When combustion engine 10 is in operation, a coolant flows through both cylinder banks 14, 16 for cooling of motor 12 (in a preferred operating flow direction, indicated by arrows 21.) For this purpose, the first cylinder bank 14 is supplied evenly with coolant through a first cylinder bank's branch section 22 and the second cylinder bank 16 through a second cylinder bank's branch section 24 that is attributed to it in the cooling system for the combustion engine 10.

The two cylinder bank branch sections 22, 24 of the cooling system are for this purpose in contact with fluid by means of the respectively designated first cylinder bank 14, 16 through a first cylinder bank inlet 26, which is arranged on the first cylinder bank 14, and through a second cylinder bank inlet 28, which is arranged on the second cylinder bank 16, and through corresponding branch section outlets of the cylinder banks (not shown) that are arranged on the cylinder bank branch sections 22, 24. For this purpose, a first cylinder bank connection device (not shown) is provided on the first cylinder inlet 26 and a second cylinder bank connection device (not shown either) on the second cylinder bank inlet 28. The two cylinder bank branch sections 22, 24 are supplied with coolant by a cooling system's primary section 30, which ends in the two cylinder bank branch sections 22, 24 upstream (relative to the preferred flow direction) from the motor 10.

The two exhaust gas heat exchangers 18, 20 as well must be appropriately cooled during the operation of the combustion engine 10. For this purpose, the first exhaust gas heat exchanger 18 has a first exhaust heat exchanger inlet 32 and the second exhaust gas heat exchanger 20 has a second exhaust gas heat exchanger inlet 34. The first exhaust gas heat exchanger 18 is supplied with coolant through a first branch section of the exhaust gas heat exchanger 36 of the cooling system, which (through a exhaust gas heat exchanger's branch section inlet) is in contact with fluid by a cylinder bank outlet 31 and (through a branch section outlet of the exhaust gas heat exchanger designated for it) by the first inlet 32 of the exhaust gas heat exchanger, meanwhile the second exhaust gas heat exchanger 20 is supplied with coolant through a first branch section of the exhaust gas heat exchanger 38 of the cooling system, which (again through a branch section inlet of the exhaust gas heat exchanger) is in contact with fluid by a second cylinder bank outlet 33 and (through a branch section outlet of the exhaust gas heat exchanger designated for it) by the first inlet 34 of the exhaust gas heat exchanger.

For outflow of the coolant, the first exhaust gas heat exchanger 18 has a first exhaust gas heat exchanger outlet 40 and the second exhaust gas heat exchanger 20 has a second exhaust gas heat exchanger outlet 42. The first exhaust gas heat exchanger 18 is in contact with fluid through the first exhaust gas heat exchanger outlet 40 designated for it with a first merging branch section 44 of the cooling system (through an inlet for the merging branch section that is designated for it), meanwhile the second exhaust gas heat exchanger 20 is in contact with fluid through the second exhaust gas heat exchanger outlet 42 designated for it with a second merging branch section 46 of the cooling system (through an inlet for the merging branch section that is designated for it.)

Both merging branch sections 44, 46 end downstream from the exhaust gas heat exchanger outlets 40, 42 in a merge point or merge section 48 in the cooling system's primary section 30. Serving for purposes of merging the two coolant flows 21a, 21b in the described embodiment is, e.g. a connecting pipe 50, which is component of the second merging branch section 46. The merging of the partial flows takes place in a coolant elbow 52, which merges coolant partial flows 21a, 21b in the cooling system's primary section 30.

Furthermore the described embodiment of a combustion engine 10 is comprised of a coolant pump 54 for agitation of the coolant and of an oil heat exchanger 56 for temperature control of motor oils, which serves as grease for the motor 12. The coolant pump 54 is in contact with fluid with the coolant primary section 30 through a coolant pump inlet 58 that is designated for it, as well as through a coolant pump outlet 60. The same applies to the oil heat exchanger 56, which is in contact with fluid by the coolant primary section 30 through an oil heat exchanger inlet 62 and an oil heat exchanger outlet 64. Both components 54, 56 are arranged downstream from the merger section 48.

Arranged downstream from the merge point 48 and thus downstream from the coolant elbow 52, however upstream from coolant pump 54 are a retard inlet connection 66 in the cooling system's primary section 30 and a retard outlet connection 68, which are in contact with fluid in the described embodiment by a retard inlet 70 or a retard outlet 72 of a retarder 74 that are arranged in the combustion engine.

It is ensured by the design in this location (downstream from the merge section 48) that the retarder 74 connected to retarder inlet connection 66 and retarder outlet connection 68 has the entire coolant flow available on the one hand and on the other hand it is ensured that the flow conditions in the two partial coolant flows 21a, 21b are not affected unevenly by an extraction of coolant by the retarder inlet connection 66, which would lead to an unintended worsening of the emission values, since the two cylinder banks 14, 16 and the two exhaust gas heat exchangers 18, 20 would receive different cooling. Such would entail that the exhaust gas to be cooled by the exhaust gas heat exchangers 18, 20 and which is to be led back to combustion (approx. 30% to 40% of the total exhaust gas) would have an undesired temperature and possibly also an undesired composition (in case of differing cooling of cylinder banks.)

Furthermore, a thermostat 76 is arranged in the cooling system's primary section 30, which, depending on the prevalent temperature in the coolant, the coolant flow into a bypass 78 of the cooling system's primary section (which together with the other aforementioned components defines a so-called small cooling circuit), and thus directly leads to the coolant pump 54 or to a cooling outlet 80 of the cooling system's primary section 30, which is in contact with fluid through a motor oil cooler 82 and a hot-circuit radiator 84 for cooling the coolant (so-called large cooling circuit.) For this purpose the motor oil coolers 82 and the hot-circuit radiator 84 comprise corresponding coolant inlets and coolant outlets that are in contact with fluid by the appropriate connection devices of the cooling system's primary section 30. In flowing through the large cooling circuit, the coolant is led through a coolant inlet 86 of the cooling system's primary section 30 to the coolant pump 54.

Both the cooling system's primary section 30 as well as the cooling system's branch sections are implemented by means of pipes in the present described embodiment; alternatively e.g. hoses are also feasible for this purpose. It should be noted at this juncture that the cooling system in its simplest embodiment merely comprises the cooling system's primary section 30 and the cooling system's branch sections, whereas all other mentioned components can be components (as applies, also integral components) of the combustion engine 10. In alternative, the components mentioned above and in the subclaims, can also be components (as applies, integral component) of the cooling system. The inventive step however is already realized in the simplest embodiment and the technical solution is thereby defined accordingly.

Although the disclosure is described by means of an embodiment with a fixed combination of characteristics, it nonetheless also includes the feasible additional advantageous combinations as they are presented in particular, yet not exhaustively, by the subclaims. All characteristics disclosed in the application documents are claimed as relevant to the disclosure, insofar as they are new, individually or in combination, compared to the state of the art.

The invention claimed is:

1. A cooling system for a combustion engine comprising a compression ignition (CI) motor with at least two cylinder banks, the cooling system comprising:
    an identical number of exhaust gas heat exchangers as the number of cylinder banks, and a fluid serving as coolant flows through the cooling system in a preferred flow direction;
    a primary section configured to be secured to a retarder; and
    an identical number of branch sections as the number of cylinder banks of the CI motor, and the branch sections fluidly communicate with the primary section;
    wherein each one of the branch sections has a cylinder bank branch section, a heat exchanger branch section, and a merging branch section,
    wherein the primary section ends in the cylinder bank branch sections, and each one of the cylinder bank branch sections has a branch section outlet that is in contact with fluid through a designated cylinder bank inlet;
    wherein each one of the heat exchanger branch sections comprises a branch section inlet of the exhaust gas heat exchanger and a branch section outlet of the exhaust gas heat exchanger, and each one of the heat exchanger branch sections is in contact with fluid through a designated cylinder bank outlet and each one designated exhaust gas heat exchanger inlet;
    wherein each one of the merging branch sections has a merging branch section inlet, and each one of the merging branch sections is in contact with fluid by an exhaust gas heat exchanger outlet, and each one of the merging branch sections is furthermore in contact with fluid through the primary section in the preferred flow direction downstream from the merging branch section inlets.

2. The cooling system according to claim 1, wherein the cooling system's primary section comprises a hot-circuit radiator.

3. The cooling system according to claim 1, wherein the cooling system's primary section and/or the cooling system's branch sections are designed in tube shape or as hoses.

4. The cooling system according to claim 1, wherein the cooling system has an identical number of cooling system branch sections and motor heat exchangers for cooling the CI motor.

5. The cooling system according to claim 1, wherein the cooling system has an identical number of exhaust gas heat exchangers as the number of cooling system's branch sections.

6. The cooling system according to claim 1, wherein the cooling system has at least one oil heat exchanger.

7. The cooling system according to claim 1, wherein the cooling system has a coolant pump.

8. The cooling system according to claim 1, wherein the cooling system has at least one thermostat.

9. The cooling system according to claim 1, further comprising the compression ignition motor.

10. The cooling system according to claim 1, wherein the merging branch sections receive parallel partial coolant flows from the exhaust gas heat exchangers, and the merging branch sections combine the parallel partial coolant flows upstream of the primary section such that an extraction of coolant from the primary section evenly affects the partial coolant flows of the exhaust gas heat exchangers.

11. A combustion engine, comprising:
a compression ignition (CI) motor with at least two cylinder banks and with an identical number of cylinder banks and exhaust gas heat exchangers; and
a cooling system through which a fluid flows in a preferred flow direction, the cooling system including:
  a primary section configured to be secured to a retarder; and
  an identical number of branch sections as the number of cylinder banks of the CI motor, and the branch sections fluidly communicate with the primary section;
  wherein each one of the branch sections has a cylinder bank branch section, a heat exchanger branch section, and a merging branch section,
  wherein the primary section ends in the cylinder bank branch sections, and each one of the cylinder bank branch sections has a branch section outlet that is in contact with fluid through a designated cylinder bank inlet;
  wherein each one of the heat exchanger branch sections comprises a branch section inlet of the exhaust gas heat exchanger and a branch section outlet of the exhaust gas heat exchanger, and each one of the heat exchanger branch sections is in contact with fluid through a designated cylinder bank outlet and each one designated exhaust gas heat exchanger inlet;
  wherein each one of the merging branch sections has a merging branch section inlet, and each one of the merging branch sections is in contact with fluid by an exhaust gas heat exchanger outlet, and each one of the merging branch sections is furthermore in contact with fluid through the primary section in the preferred flow direction downstream from the merging branch section inlets.

12. The combustion engine according to claim 11, wherein the combustion engine has motor heat exchangers that are integral components of the CI motor.

13. The combustion engine according to claim 11, wherein the combustion engine includes the retarder.

14. The combustion engine according to claim 11, wherein the combustion engine has a hot-circuit radiator.

15. The combustion engine according to claim 11, wherein the combustion engine has a charge air cooler, which serves to cool the cylinder banks.

16. A cooling system for a combustion engine comprising a compression ignition motor, the cooling system comprising:
  a primary section configured to be secured to at least one retarder;
  a plurality of branch sections disposed in parallel and fluidly communicating with the primary section, such that a fluid serving as coolant flows through the cooling system in a preferred flow direction wherein the number of branch sections is identical to a number of cylinder banks of the compression ignition motor; and
  an identical number of exhaust gas heat exchangers as the number of cylinder banks, and each one of the exhaust gas heat exchangers is disposed in a corresponding one of the branch sections;
  wherein each one of the branch sections has a cylinder bank branch section, a heat exchanger branch section and a merging branch section;
  wherein each one of the cylinder bank branch sections fluidly communicates with a cylinder bank inlet of a corresponding cylinder bank, such that each one of the cylinder bank branch sections is configured to direct fluid from the primary section to a corresponding one of the cylinder banks;
  wherein each one of the heat exchanger branch sections includes a branch section outlet of the cylinder bank and a branch section inlet of the exhaust as heat exchanger, such that each one of the heat exchanger branch selections is configured to direct fluid from a corresponding cylinder bank to a corresponding exhaust as heat exchanger;
  wherein each one of the merging branch sections fluidly communicates with an exhaust as heat exchanger outlet and the primary section, such that each one of the merging branch sections is configured to direct a parallel partial coolant flow flowing through the corresponding exhaust as heat exchanger to the primary section; and
  wherein the merging branch sections combines each of the parallel partial coolant flows upstream of the primary section such that an extraction of coolant from the primary section evenly affects the partial coolant flows of the exhaust as heat exchangers.

17. The cooling system according to claim 16, further comprising the compression ignition motor.

* * * * *